United States Patent [19]

Kasanuki et al.

[11] Patent Number: 5,140,938
[45] Date of Patent: Aug. 25, 1992

[54] THIN FILM FORMING DEVICE

[75] Inventors: Yuji Kasanuki, Yokohama; Takayuki Yagi, Tokyo; Kenji Suzuki; Hiroshi Takagi, both of Yokohama, all of Japan

[73] Assignee: Canon Kabushiki Kaisha, Tokyo, Japan

[21] Appl. No.: 681,469

[22] Filed: Apr. 4, 1991

Related U.S. Application Data

[60] Continuation of Ser. No. 463,555, Jan. 11, 1990, abandoned, which is a division of Ser. No. 283,904, Dec. 13, 1988, Pat. No. 4,913,933.

[30] Foreign Application Priority Data

Dec. 21, 1987 [JP] Japan .................. 62-321574

[51] Int. Cl.⁵ .............................................. C23C 16/00
[52] U.S. Cl. .................................................. 118/718
[58] Field of Search ............... 118/718, 720, 721, 724, 118/725, 729

[56] References Cited

U.S. PATENT DOCUMENTS 2,709,663  5/1955  McLean ............................... 118/720
4,380,211  4/1983  Shnohara ............................ 118/718

Primary Examiner—Bernard Nozick
Attorney, Agent, or Firm—Fitzpatrick, Cella, Harper & Scinto

[57] ABSTRACT

A physical vapor deposition device having a delivery roller for delivering a substrate, a rotatory drum upon which a magnetic recording layer is formed on the substrate and a wind-up roller which winds up said substrate. The device also has a heating source ahead of the rotatory drum and one or more conveying rollers, wherein one of the conveying rollers is an expander roller which is provided between the delivery roller and the rotatory drum. A thin film forming device uses the expander roller and also has a delivery roller, at least one conveying roller and a wind-up roller.

22 Claims, 2 Drawing Sheets

THIN FILM FORMING DEVICE

This application is a continuation of application Ser. No. 463,555, filed Jan. 11, 1990 now abandoned, which is a division of application Ser. No. 283,904, filed Dec. 13, 1988, now U.S. Pat. No. 4,913,933.

BACKGROUND OF THE INVENTION

This invention relates to a method for preparing a magnetic recording medium and to a physical vapor deposition device.

In recent years, higher densification of magnetic recording medium such as tape, disc, etc. has been strongly demanded, and researches and developments of various methods for preparation of medium are under progress. A method in which a metal thin film is used for the magnetic recording layer of a magnetic recording medium is one of them.

As the method for forming the metal thin film recording layer, the wet process method by plating and the physical vapor deposition method such as vacuum vapor deposition, sputtering, etc. have been studied. In the wet process method, management of the plating bath is cumbersome and therefore it is not suitable for continuous film formation and also severe management is required in disposal of waste liquors, thus involving many problems. Therefore, the use of physical vapor deposition processes for film formation has become accepted in the art.

As the magnetic recording layer, a vertically magnetized film capable of accomplishing high density recording has recently been widely studied. As the vertical magnetized film, a Co type alloy is effective.

In the case of forming a magnetic recording layer of vertically magnetized film, for obtaining desired magnetic characteristics, it is required in most cases to form a film of the magnetic recording layer while heating the non-magnetic substrate. However, when a magnetic layer is formed while heating the non-magnetic substrate, wrinkle will be generated on the substrate.

As the method for preparing a magnetic recording layer on a non-magnetic substrate according to the vacuum vapor deposition method or the sputtering method, it is most generally practiced to effect film formation while permitting a polymer substrate to run along a rotary drum. Whereas, when film formation is effected at a high circumferential temperature of the rotary drum, wrinkle will be generated when the polymer substrate contacts the rotary drum. The cause for generation of wrinkle may be considered as follows. When the substrate contacts the rotary drum, the substrate will be abruptly heated because of high temperature of the rotary drum, whereby gas liberation from the substrate and thermal deformation occur. When a gas is generated from the substrate in contact on the rotary drum, gaps are formed between the substrate and the drum, which may become the cause for wrinkle. At the same time, thermal deformation of the substrate is conveyed as such to become wrinkle.

Generation of such wrinkle will occur readily when the circumferential temperature of the rotary drum is 80° C. or higher and become more marked as the thickness of the polymer substrate is smaller, particularly 10 μm or less.

In the prior art, for prevention of generation of wrinkle, there have used the method in which a nip roller 9 is provided as shown in FIG. 5 or the method in which the substrate is heated with a lamp 11 on a pre-heating roller 10. However, these methods proved to be insufficient by the investigation by the present inventors.

The nip roller 9 is intended to prevent generation of wrinkle by pressing the substrate 1, but when the temperature of the rotary drum 2 is high, generation of wrinkle cannot be prevented by pressing of the substrate 1 and the wrinkle is pressed under the nip roller 9 to become folded wrinkle.

In the case of the pre-heating roller 10, when the temperature of the rotary drum 2 becomes higher, the temperature of the pre-heating roller 10 must be also made higher, consequently resulting in formation of wrinkle on the pre-heating roller 10.

SUMMARY OF THE INVENTION

The present invention solves the problems as described above and its object is to provide a method for preparing a good magnetic recording medium free from wrinkle.

According to one aspect of the present invention, there is provided a preparation method of the present invention comprising delivering a substrate from a delivery roller, passing the substrate through one or a plurality of conveying rollers and forming a magnetic recording layer on the above substrate by the physical vapor deposition method in the course of running along the circumferential surface of a rotary drum, which method is characterized in that the above substrate is heated between the delivery roller and the conveying roller or between conveying a roller and another conveying roller, and the conveying roller through which the above substrate passes after heating is made an expander roller.

According to another aspect of the present invention, there is provided a physical vapor deposition device of the present invention comprising a delivery roller for delivering a substrate, a rotary drum which permits the above substrate delivered from the above delivery roller through one or a plurality of conveying rollers to run along the circumferential surface thereof and a wind-up roller which winds up the above substrate on which a magnetic recording layer is formed during running along the circumferential surface of the above rotary drum, which device is characterized in that a heating source is provided from a delivery roller and a conveying roller or between a conveying roller and another conveying roller, and the conveying roller lying between the above heating source and the above rotary drum is made an expander roller.

According to the method of the present invention, by applying heat treatment on a polymer substrate between rollers on the conveying pathway from the delivery roller to the rotary drum, and making the conveying roller through which the substrate passes after the heat treatment an expander roller, it is possible to remove wrinkles generated during formation of a magnetic recording layer by the physical vapor deposition method on a polymer substrate in the prior art, whereby a magnetic recording medium free from wrinkle can be obtained.

DETAILED DESCRIPTION OF THE INVENTION

In the present invention, a magnetic recording medium is prepared according to the physical vapor deposition method such as vacuum vapor deposition or sputtering.

Figure 1:
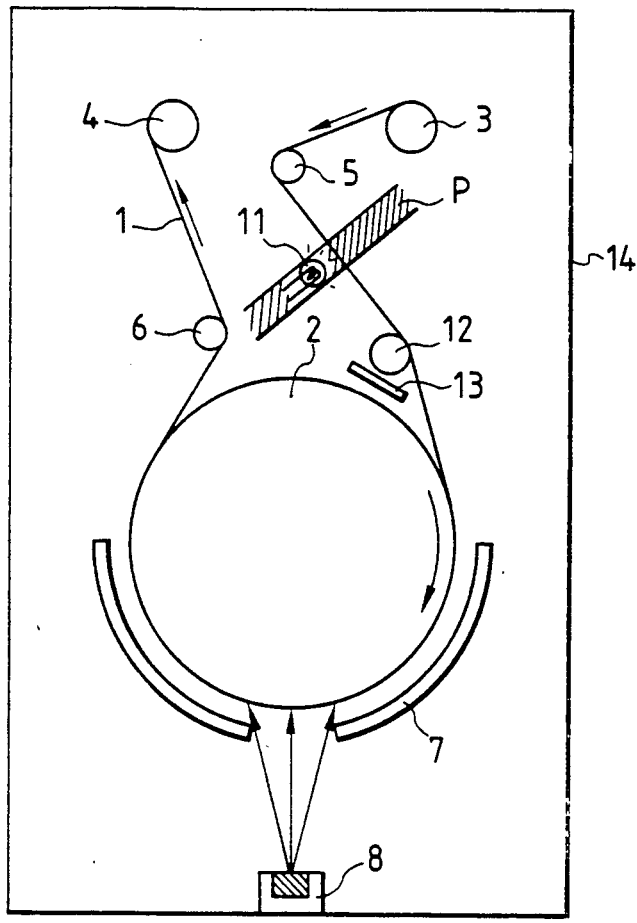
FIG. 1 is a front view of the physical vapor deposition device for practicing the preparation method of the present invention.

In FIG. 1, 1 is a polymer substrate, 2 a rotary drum of which circumferential temperature is adapted to be settable as desired up to 300° C. 3 is a delivery roller, 4 a wind-up roller, 5 and 6 are conveying rollers. 7 is a mask for restricting the incident angle of a flux of vaporized particles, 8 a vaporization source or a sputtering target, 11 a lamp for heating, 12 a conveying roller by use of an expander roller, and 13 a heat-protecting plate optionally provided for protection against radiation heat from the rotary drum 2. All of these are housed within a vacuum tank 14.

Now, the substrate 1 is delivered from the delivery roller 3 and, after having passed the conveying roller 5, is pre-heated with the lamp for heating 11 which is the heating source. At the place where pre-heating is effected with the lamp 11, the substrate 1 is under completely free state without contact with any roller. The position where the heating source 11 is provided may be preferably a position such that, when a zone P (the hatched portion in FIG. 1) formed when moving the orthogonal projection of the heating source onto the substrate in the direction perpendicular to the substrate 1 is considered, neither the conveying roller 5 nor the expander roller 12 comes within the zone P. Further, the position may be preferably such that both the conveying roller 5 and the expander roller 12 do not come within the zone formed by expanding the zone P to 50 mm therearound.

By providing the heating source 11 as described above, no gas will be liberated from the substrate 1, and even when thermal deformation may occur on the substrate 1, since the substrate 1 is not in contact with any other matter, no wrinkle will be generated. As the heating source 11, a halogen lamp may be preferably used.

The pre-heated substrate 1 reaches the conveying roller 12 by use of an expander roller. The thermal deformation of the substrate 1 formed by pre-heating is corrected by the expander roller 12.

Figure 2:
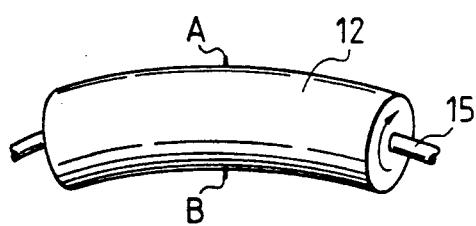
FIG. 2 is a perspective view showing an embodiment of the expander roller.

The expander roller 12, as shown in FIG. 2, is a roller which rotates under curved state.

The position of the top point A on the convex side of the curved expander roller 12, if it is once adjusted, is adapted to be unmovable even when the roller 12 may rotate. In other words, the direction in which the convex portion of the expander roller is faced will not move except when adjustment. Such state can be obtained by, for example, rotating only the roller 12 without rotation of the curved shaft 15.

The roller 12 should be preferably formed of an elastic material on account of its form. As the elastic material, there may be included natural rubber and synthetic rubbers generally known as "rubber" [e.g. styrene-butadiene rubber (SBR), butadiene rubber (BR), isoprene rubber (IR), ethylene-propylene rubber (EPM, EPDM), butyl rubber (IIR), chloroprene rubber (CR), acrylonitrile-butadiene rubber (NBR), urethane rubber (U), silicone rubber (Si), fluorine rubber (FPM), polysulfide rubber (T), polyether rubber (POR, CHR, CHC, etc.].

By use of a rubber for the roller 12, the substrate 1 heated is delivered to the rotary drum 2 without being cooled. For this reason, the substrate 1 will not be abruptly heated on the rotary drum 2, whereby generation of wrinkle can be prevented.

Figure 3:
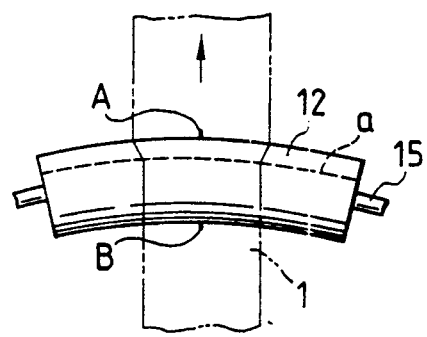
FIG. 3 is a front view of the expander roller shown in FIG. 2.
Figure 4:
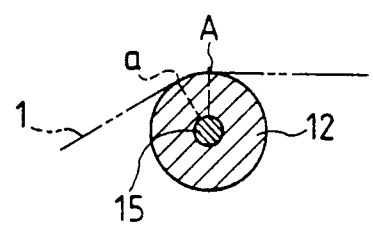
FIG. 4 is a cross sectional view of the expander roller shown in FIG. 2.
Figure 5:
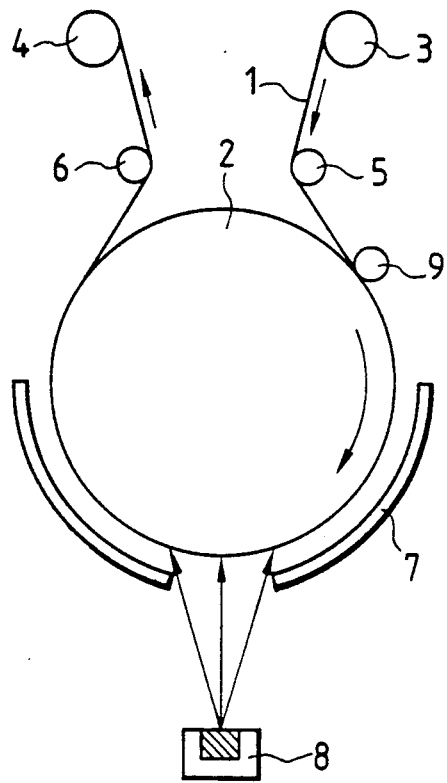
FIG. 5 and FIG. 6 are front views showing the examples of the physical vapor deposition devices of the prior art.
Figure 6:
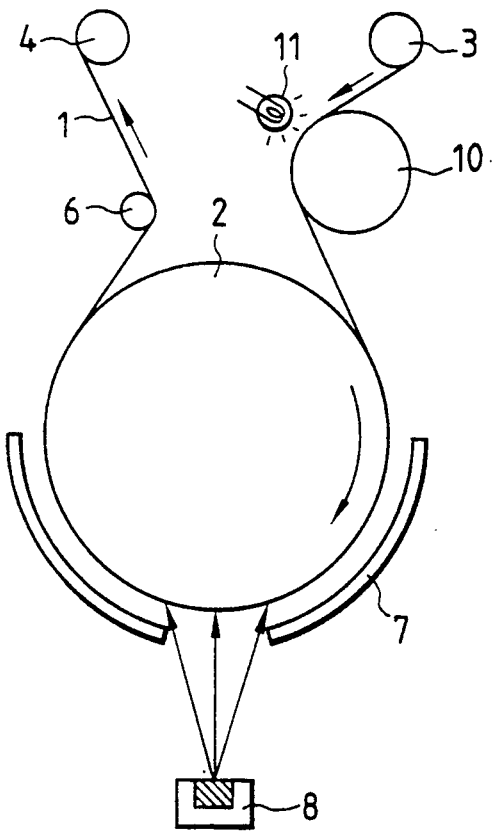

On the expander roller 12 constituted as described above, with rotation from the top point B on the concave side to the top point A on the convex side, its surface becomes gradually enlarged. Accordingly, as shown in FIG. 3 and FIG. 4, in the course of reaching the top point A on the convex side from the top point B on the concave side, the substrate 1 begins to contact the roller 12 (in FIG. 3 and FIG. 4, the substrate 1 begins to contact the roller 12 on the generating line a), and by adapting the substrate 1 to be departed from the roller 12 on the generating line passing the top point A on the convex side, a tension will act on the substrate 1 in the width direction, whereby generation of wrinkle can be prevented.

When the substrate is departed from the roller 12 at a position beyond the top point A on the convex side, a shrinking force will act on the substrate 1 and therefore wrinkle will be formed. For this reason, the direction in which the convex portion of the roller is faced is adjusted so that the substrate 1 may be departed on the generating line passing the top point A on the convex side of the roller 12.

The extent of curving of the expander roller cannot be unconditionally, and when the length of the expander roller 12 is 200 mm, the top point A on the convex side should be preferably higher by 1 to 5 mm from the end of the roller 12. The distance of movement of the substrate 1 in contact with the expander roller 12 may be preferably about 5 to 20 mm. The expander roller 12 should have an outer diameter preferably of 50 to 100 mm.

In some cases, the substrate 1 may be delivered from the delivery roller 3 directly to the expander roller 12 without via the conveying roller.

Also, when a heat-protecting plate 13 is provided between the expander roller 12 and the rotary drum 2, the expander roller 12 will not be heated with the radiation heat from the rotary drum, preferably.

The substrate 1 after passing through the expander roller 12 reaches the rotary drum 2 and runs along the circumferential surface of the rotary drum 2. The rotary drum 2 can be set at any desired value of circumferential temperature up to 300° C.

The substrate 1, in the course of running along the circumferential surface of the rotary drum 2, receives a flux of metal particles from the vaporization source or sputtering target 8, whereby a magnetic recording layer is formed thereon. The flux of metal particles is restricted in its incident angle with the mask 7.

The substrate 1 having a metal film formed thereon then passes through the conveying roller 6 and is wound up on the wind-up roller 4. Thus, a magnetic recording medium having a magnetic recording layer of a metal is prepared.

The vacuum deposition device and the sputtering device are distinguished by whether the flux of particles forming the magnetic recording layer is vaporized from a vaporization source or sputtered from a sputtering target, and the constitution of the device is substantially the same.

As the material to be used for the magnetic recording layer, a Co type alloy which becomes the vertically magnetized film is preferred. The Co type alloy takes h.c.p. structure, in which the C-axis direction becomes the readily magnetizable direction. Specifically, there can be employed Co-Cr alloys, and otherwise Co-V, Co-Mo, Co-W, Co-Cr-Pd, Co-Cr-Mo, Co-Cr-Rh alloys and alloys in which slight amounts of additives are added to them.

The coercive force $Hc\perp$ of the magnetic recording layer of the Co type alloy in the vertical direction to the substrate becomes higher as the temperature during formation of the magnetic recording layer is higher. The temperature of the substrate 1 is equal to the circumferential temperature of the rotary drum 2. Coercive force $Hc\perp$ is practically required to be at least 400 Öe. For this purpose, the substrate temperature should be preferably made 80° C. or higher in vacuum vapor deposition and 50° C. or higher in sputtering.

As the substrate 1, films of polyethyleneterephthalate, polyimide or aramide, etc. are suitable.

The thickness of the magnetic recording layer may be suitably within the range of 5 to 100 $\mu$m, and the thickness of the substrate within the range of 0.05 to 1.0 $\mu$m.

On the magnetic recording layer, as the protective layer, a film formed by oxidation of the magnetic recording layer surface, a layer comprising $Al_2O_3$, $SiO_2$, $Co_3O_4$, Co-Cr-O or Co-Ni-O may be also provided. Further, as the lubricating layer, an organic film of a fluorine type resin, an ester type oligomer, etc. may be also provided. Between the substrate 1 and the magnetic recording layer, an intermediate layer such as a metal film of Ti, Bi, Ge, etc. or an amorphous film may be also interposed. By providing such intermediate layer, for example, orientation of the magnetic recording layer 2 can be improved. For the purpose of improved recording efficiency and increasing reproduction output, a high permeability magnetic layer may be also provided between the substrate 1 and the magnetic recording layer or between the substrate 1 and the above intermediate layer.

The present invention is described in more detail by referring to Examples.

EXAMPLES

By use of a vacuum deposition device and a sputtering device having a conveying system as shown in FIG. 1, a magnetic recording layer of Co-Cr alloy was formed on a polymer substrate.

As the substrate 1, a polyimide film, aramide film and a polyethyleneterephthalate (PET) film all having a width of 80 mm were used. For polymide film, those with thicknesses of 7.5 $\mu$m and 12.5 $\mu$m were employed. For aramide film, those with thicknesses of 6 $\mu$m and 12 $\mu$m were employed. For PET film those with thicknesses of 7 $\mu$m and 10 $\mu$m were employed.

On polyimide film and aramide film, a magnetic recording layer of Co-Cr alloy was formed to 0.4 $\mu$m by the vacuum vapor deposition method at respective substrate temperatures of 240° C. and 200° C. On PET film was first formed a Permalloy layer to 0.4 $\mu$m by the sputtering method at room temperature, and then a magnetic recording layer of Co-Cr alloy was formed to 0.2 $\mu$m at a substrate temperature of 90° C.

As the heating source 11, a halogen lamp was used, and the halogen lamp was provided at a distance of 2.0 cm apart from the substrate 1. As the expander roller 12, one having a length of 200 mm and a diameter of 70 mm was used. The expander roller 12 was curved with the top point on the convex side being higher by 2 mm from the end.

Thus, generation of wrinkle on the magnetic recording medium was examined when the power of the halogen lamp was varied from 1.0 (W/cm) to 10.5 (W/cm) at intervals of 0.5 (W/cm). The results are described below.

In the PET film of 7 $\mu$m, generation of wrinkle could be prevented within the range of the power of the halogen lamp from 1.5 to 2.5 (W/cm). When the power of the halogen lamp exceeded 2.5 (W/cm), plastic deformation of the substrate occurred.

In the PET film of 10 $\mu$m, generation of wrinkle could be prevented within the range of the power of the halogen lamp from 2.0 to 3.0 (W/cm). When the power of the halogen lamp exceeded 3.0 (W/cm), plastic deformation of the substrate occurred.

In the Aramide film of 6 $\mu$m, generation of wrinkle could be prevented within the range of the power of the halogen lamp from 3.0 to 6.0 (W/cm). When the power of the halogen lamp exceeded 6.0 (W/cm), plastic deformation of the substrate occurred.

In the Aramide film of 12 $\mu$m, generation of wrinkle could be prevented within the range of the power of the halogen lamp from 4.0 to 6.5 (W/cm). When the power of the halogen lamp exceeded 6.5 (W/cm), plastic deformation of the substrate occurred.

In the polyimide film of 7.5 $\mu$m, generation of wrinkle could be prevented within the range of the power of the halogen lamp from 4.0 to 7.0 (W/cm). When the power of the halogen lamp exceeded 7.0 (W/cm), plastic deformation of the substrate occurred.

In the polyimide film of 12.5 $\mu$m, generation of wrinkle could be prevented within the range of the power of the halogen lamp from 5.0 to 8.0 (W/cm). When the power of the halogen lamp exceeded 8.0 (W/cm), plastic deformation of the substrate occurred.

Also, the coercive force in the vertical direction to the magnetic recording layer of the magnetic recording medium prepared was measured. The results are shown below in Table.

|  | PET | | Aramide | | Polyimide | |
| --- | --- | --- | --- | --- | --- | --- |
|  | 7 $\mu$m | 10 $\mu$m | 6 $\mu$m | 12 $\mu$m | 7.5 $\mu$m | 12.5 $\mu$m |
| $Hc\perp$ (Oe) | 750 | 750 | 690 | 710 | 800 | 820 |

What is claimed is:
1. A physical vapor deposition device, comprising:
a delivery roller;
a heating source;
an expander roller;
a rotary drum; and
a wind-up roller, wherein said delivery roller delivers a belt substrate along a predetermined path sequentially past said heating source for heating said belt substrate and over said expander roller and said rotary drum at which a magnetic recording layer is formed on said belt substrate to said wind-up roller upon which said substrate having said magnetic recording layer is wound up;
said physical vapor deposition device further comprising a vapor deposition source located adjacent said rotary drum for forming said magnetic record- ing layer, wherein said expander roller has a length and a round cross-section, said length having an arcuate profile.

2. A device according to claim 1, wherein said expander roller is formed of a rubber.

3. A device according to claim 1, wherein said round cross-section of said expander roller has a diameter which is constant along said length.

4. A device according to claim 3, wherein said diameter is from 50 to 100 mm.

5. A device according to any of claims 1, 3 or 4, wherein said length of said expander roller is 200 mm and said arcuate profile is from 1 to 5 mm higher at a convex portion that at an end of said expander roller.

6. A device according to claim 5, wherein said belt substrate contacts said expander roller from 5 to 20 mm along a circumference of said expander roller.

7. A device according to claim 1, further comprising a conveying roller located between said delivery roller and said heating source.

8. A device according to claim 1 or 7, further comprising a conveying roller located between said rotatory drum and said wind-up roller.

9. A device according to claim 1, wherein said heating source heats said belt substrate within a heating zone and wherein said expander roller is not located within said heating zone.

10. A device according to claim 9, wherein said expander roller is not located within 50 mm of said heating zone.

11. A thin film forming device for forming a thin film on a belt substrate, comprising:
    a delivery roller;
    a heating source;
    an expander roller;
    means for forming said thin film; and
    a wind-up roller, wherein said delivery roller delivers said belt substrate along a predetermined path past said heating source for heating said belt substrate, over said expander roller and past said means for forming said thin film on said belt substrate at a film-forming location to said wind-up roller for winding up said belt substrate upon which said thin film is formed, wherein said expander roller has a length and a round cross-section, said length having an arcuate profile.

12. A thin film forming device according to claim 11, wherein the expander roller is formed of a rubber.

13. A device according to claim 11, wherein said round cross-section of said expander roller has a diameter which is constant along said length.

14. A device according to claim 13, wherein said diameter is from 50 to 100 mm.

15. A device according to any of claims 11, 13 or 14, wherein said length of said expander roller is 200 mm and said arcuate profile is from 1 to 5 mm higher at a convex portion that at an end of said expander roller.

16. A device according to claim 15, wherein said belt substrate contacts said expander roller from 5 to 20 mm along a circumference of said expander roller.

17. A device according to any of claims 11, 13 or 14, wherein said means for forming said thin film comprises a vaporization source.

18. A device according to any of claims 11, 13 or 14, wherein said means for forming said thin film comprises a sputtering target.

19. A device according to claim 11, further comprising a conveying roller located between said delivery roller and said heating source.

20. A device according to claim 11 or 19, further comprising a conveying roller located between said thin film forming means and said wind-up roller.

21. A device according to claim 11, wherein said heating source heats said belt substrate within a heating zone and wherein said expander roller is not located within said heating zone.

22. A device according to claim 21, wherein said expander roller is not located within 50 mm of said heating zone.

* * * * *

UNITED STATES PATENT AND TRADEMARK OFFICE
CERTIFICATE OF CORRECTION

PATENT NO. : 5,140,938
DATED : August 25, 1992
INVENTOR(S) : KASANUKI ET AL.

It is certified that error appears in the above-identified patent and that said Letters Patent is hereby corrected as shown below:

ON THE TITLE PAGE, [56] REFERENCES CITED

"Shnohara" should read --Shinohara--.

COLUMN 1

Line 67, "have used" should read --have been used--.

COLUMN 2

Line 31, "conveying a" should read --one conveying--.

COLUMN 3

Line 31, "roller." should read --roller or other matters.--.
Line 60, "adjustment." should read --adjusted--.

COLUMN 4

Line 34, "unconditionally," should read --without limit--.
Line 44, "without via" should read --without-- and "conveying roller" should read --conveying roller 5--.

UNITED STATES PATENT AND TRADEMARK OFFICE
CERTIFICATE OF CORRECTION

PATENT NO. : 5,140,938

DATED : August 25, 1992

INVENTOR(S) : KASANUKI ET AL.

It is certified that error appears in the above-identified patent and that said Letters Patent is hereby corrected as shown below:

COLUMN 7

Line 14, "that" should read --than--.

COLUMN 8

Line 17, "that" should read --than--.

Signed and Sealed this

Twelfth Day of October, 1993

Attest:

*Attesting Officer*

BRUCE LEHMAN

*Commissioner of Patents and Trademarks*